(12) United States Patent
Teper et al.

(10) Patent No.: US 12,414,537 B1
(45) Date of Patent: Sep. 16, 2025

(54) LITTER BOX WITH REMOVABLE LINER

(71) Applicant: ModProducts, LLC, Brooklyn, NY (US)

(72) Inventors: Brett Teper, Brooklyn, NY (US); Richard Williams, Brooklyn, NY (US)

(73) Assignee: MODPRODUCTS, LLC, Brooklyn, NY (US)

( * ) Notice: Subject to any disclaimer, the term of this patent is extended or adjusted under 35 U.S.C. 154(b) by 0 days.

(21) Appl. No.: 18/780,708

(22) Filed: Jul. 23, 2024

Related U.S. Application Data

(63) Continuation-in-part of application No. 29/932,824, filed on Mar. 15, 2024.

(51) Int. Cl.
 *A01K 1/01* (2006.01)

(52) U.S. Cl.
 CPC ................................. *A01K 1/0107* (2013.01)

(58) Field of Classification Search
 CPC ...... A01K 1/0107; A01K 1/0157; B65F 1/065
 See application file for complete search history.

(56) References Cited

U.S. PATENT DOCUMENTS

| | | | |
|---|---|---|---|
| 1,886,406 A | 11/1932 | Kniffin | |
| 3,218,090 A * | 11/1965 | Herman | B65F 1/06 280/79.2 |
| 5,134,974 A * | 8/1992 | Houser | A01K 1/0125 119/168 |
| 5,803,299 A * | 9/1998 | Sealy, Jr. | B65F 1/062 220/495.07 |
| 9,949,458 B2 * | 4/2018 | Kuiper | A01K 1/0114 |
| 10,000,315 B2 | 6/2018 | Faris | |
| 10,638,720 B2 * | 5/2020 | Dehne | A01K 1/0107 |
| 2006/0102084 A1 * | 5/2006 | Garfield | A01K 1/0107 119/165 |
| 2006/0175475 A1 | 8/2006 | Desantis | |
| 2007/0074531 A1 * | 4/2007 | Holder | A61L 9/01 62/78 |
| 2007/0113793 A1 * | 5/2007 | Kurahashi | A01K 1/0107 119/169 |
| 2010/0089915 A1 | 4/2010 | Fukuhara | |
| 2012/0104188 A1 | 5/2012 | Andersen | |
| 2012/0111868 A1 | 5/2012 | Banus | |
| 2016/0029587 A1 | 2/2016 | Kuiper et al. | |
| 2018/0346173 A1 | 12/2018 | Mayer | |
| 2019/0337717 A1 * | 11/2019 | McBride | B65F 1/06 |
| 2019/0344962 A1 | 11/2019 | Stetson | |

(Continued)

*Primary Examiner* — Joshua D Huson
*Assistant Examiner* — Alanna K Peterson
(74) *Attorney, Agent, or Firm* — LUCAS & MERCANTI, LLP

(57) ABSTRACT

A litter box includes a container having a wall and pegs that project upward from a top of the wall or horizontally from an inner surface of the wall, the plurality of pegs being distributed along a circumference of the container. A liner is insertable into the container with tabs connected along an upper edge of the liner. Each tab includes a connection part and a stiffener part. The connection part extends upward from the upper edge of the liner and has an opening in which a respective peg of the pegs is received to hold the liner in position in the container. The stiffener part of each tab extends laterally from opposing sides of the upper portion and holds the liner against the wall of the container when the tab is connected to the respective peg.

11 Claims, 11 Drawing Sheets

(56) References Cited

U.S. PATENT DOCUMENTS

| | | |
|---|---|---|
| 2021/0016963 A1 | 1/2021 | Lin |
| 2021/0198036 A1* | 7/2021 | Kuhl .................... B65F 1/1415 |
| 2021/0284439 A1 | 9/2021 | Brady |
| 2022/0332499 A1 | 10/2022 | Mcconnell et al. |
| 2023/0000050 A1 | 1/2023 | Tuthill et al. |

* cited by examiner

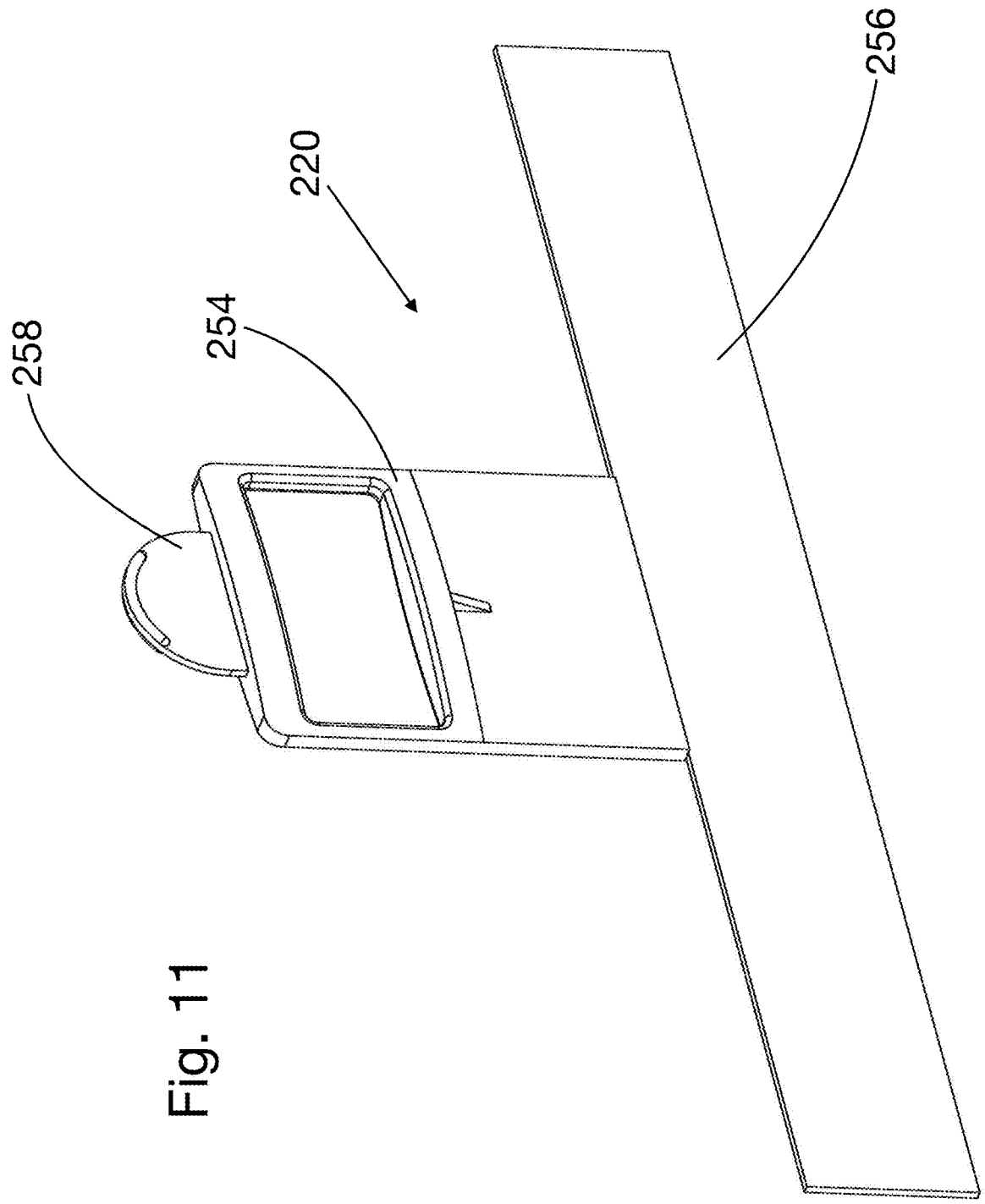

LITTER BOX WITH REMOVABLE LINER

CROSS-REFERENCE TO RELATED APPLICATIONS

The present application is a Continuation-in-Part of U.S. patent application Ser. No. 29/932,824, filed on Mar. 15, 2024, the entire contents of which are incorporated herein by reference.

BACKGROUND OF THE INVENTION

The present invention relates to a litter box with a removable liner, the liner including tabs for suspending and holding the liner against sides of the litter box.

Prior art liners are used in litter boxes to keep the litter box clean and also can be used as garbage bags to remove the soiled litter. In some cases the prior art liners can be emptied and reused. In either case, it is important to prevent litter, urine, or any type of debris from getting between the liner and the walls of the litter box. One way to accomplish this is to drape over the top rim of the litter box. However, this is not an aesthetically pleasing solution.

In one known solution, the liner includes eyelets or grommets that attached to hooks which are hung from the rim of the litter box. However, the hooks can slide along the rim and create gaps between the liner and the walls of the litter box.

BRIEF SUMMARY OF THE INVENTION

An object of the present invention is to provide a liner for a litter box that is easily removable and can be held in place along a circumference of the top of the liner to prevent litter, urine, or any other type of debris from getting between the liner and the litter box.

The object is met by a litter box including a container having a wall and pegs that project upward from a top of the wall or horizontally from an inner surface of the wall, the plurality of pegs being distributed along a circumference of the container. The litter box further includes a liner that is insertable into the container with tabs connected along an upper edge of the liner. Each tab includes an upper portion and a lower portion. The upper portion extends upward from the upper edge of the liner and has an opening in which a respective peg of the pegs is received to hold the liner in position in the container. The lower portion of each tab extends laterally from opposing sides of the upper portion and holds the liner against the wall of the container when the tab is connected to the respective peg.

In one embodiment, the container has four wall portions forming four corners, the four wall portions including a front wall portion, a rear wall portion, a first side wall portion, and a second side wall portion, and the plurality of pegs comprises four pegs arranged so that the plurality of tabs connected to the four pegs holds the liner in the four corners of the container. Although this embodiment includes four pegs and four tabs, other embodiments may use more or less than four pegs and four tabs to hold the liner against the inner wall of the container.

In a preferred embodiment, a first pair of the four pegs is arranged on the first side wall portion and a second pair of the four pegs is arranged on the second side wall portion. The four pegs are disposed so that one and of the lower portion of each tab of the plurality of tabs holds the liner in each of the four corners of the container.

In another embodiment of the invention, the four corners are curved sections, and the four pegs are disposed at the curved sections of the four corners.

In a further embodiment, the plurality of pegs project upward from the top of the wall, and the each tab of the plurality of tabs includes a living hinge on the upper portion, by which the opening of the each tab can be pivoted to fit over a corresponding peg of the plurality of pegs. The upper portion of the each tab is divided into a first part and a second part by the living hinge, the first part being disposed between the living hinge and the lower portion and the second part including the opening. While this embodiment describes the pegs as projecting upward, the pegs may also project in a direction having a horizontal component as well as a vertical component, i.e., upward and toward an outside of the container or upward and toward an inside of the container.

Each tab may include a rib disposed on at least a portion of a border of the opening to reinforce the opening and prevent it from damage.

Each tab may also include a grip portion extending from a free end of the each tab to make it easier for a user to place the tab on a peg or remove the tab from the peg.

According to another embodiment of the invention, the plurality of pegs project horizontally from the inner surface of the wall of the container. The each peg of the plurality of pegs includes a groove proximate a base thereof in which a portion of a corresponding tab of the plurality of tabs is received to prevent the corresponding tab from slipping off of the each peg. Alternatively, or additionally, each peg of the plurality of pegs includes a rib proximate a base thereof behind which a portion of a corresponding tab of the plurality of tabs is received to prevent the corresponding tab from slipping off of the each peg. Although this embodiment describes the pegs as projected horizontally, the pegs may also project in a direction having a vertical component, i.e., toward an inside of the container and upward.

The lower portion of the each tab is connected to the liner by at least one of stitching, friction fitting, gluing, welding, pinning, riveting, snap-fitting, and crimping.

In a preferred embodiment, the lower portion of each tab is sewn into a corresponding pocket of the liner.

In yet another embodiment, the tab is incorporated into the liner as a die-cut portion of the material of the liner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denotes similar elements throughout the several views:

FIG. 11 is a perspective view of a tab according to the embodiment of FIGS. 6-10.

DETAILED DESCRIPTION OF THE PREFERRED EMBODIMENTS

Figure 1:
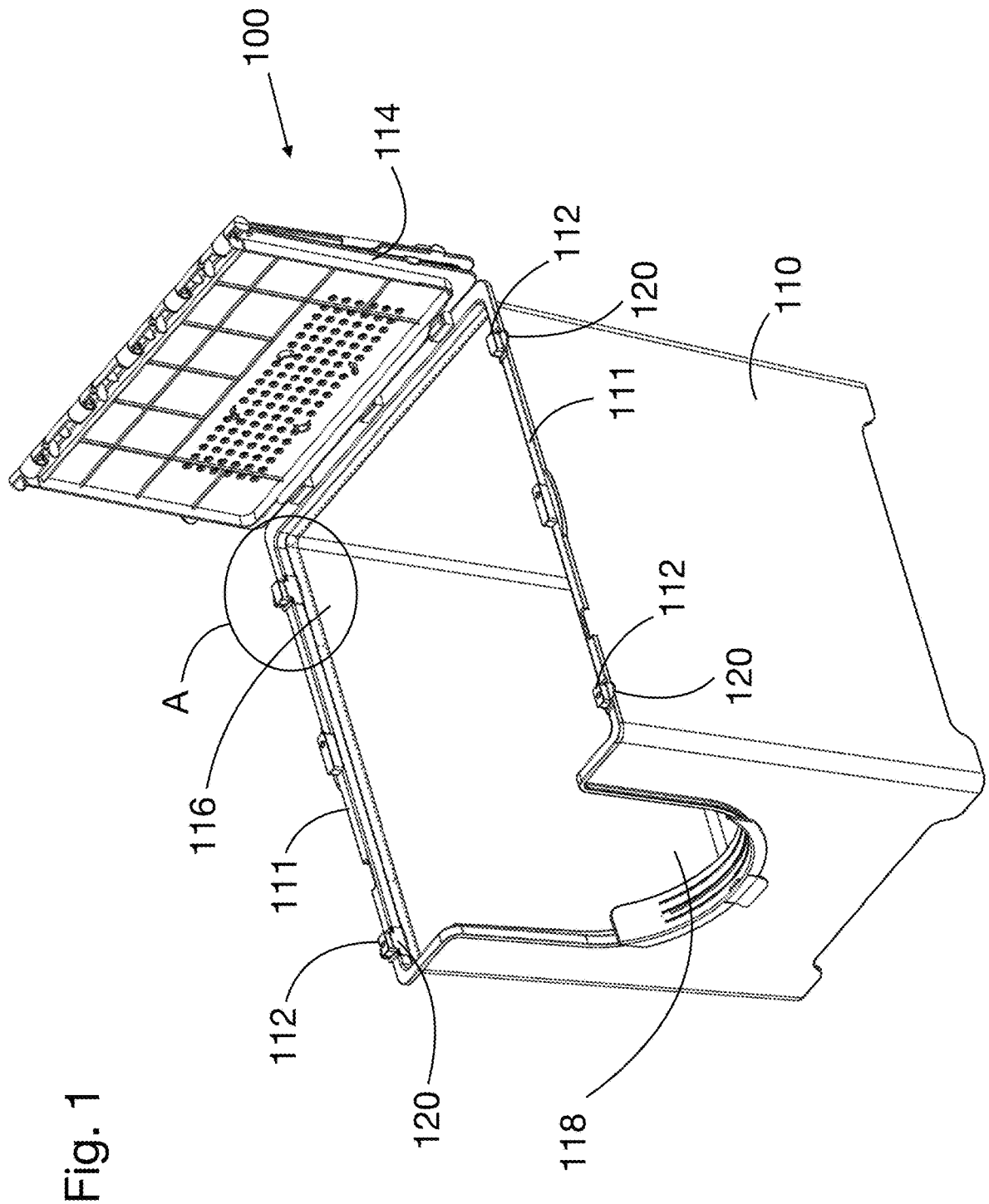
FIG. 1 is a perspective view of a litter box according to an embodiment of the present invention.

FIG. 1 shows an embodiment of a litter box 100 according to a first embodiment of the present invention. The litter box 100 includes a container 110 and a liner 116. The container 110 has an opening 118 on one of the wall sections and the liner 116 has a corresponding opening. A cover 114 is placed on top of the container 110. An upper rim 111 of the container 110 includes pegs 112 that project upward.

Figure 2:
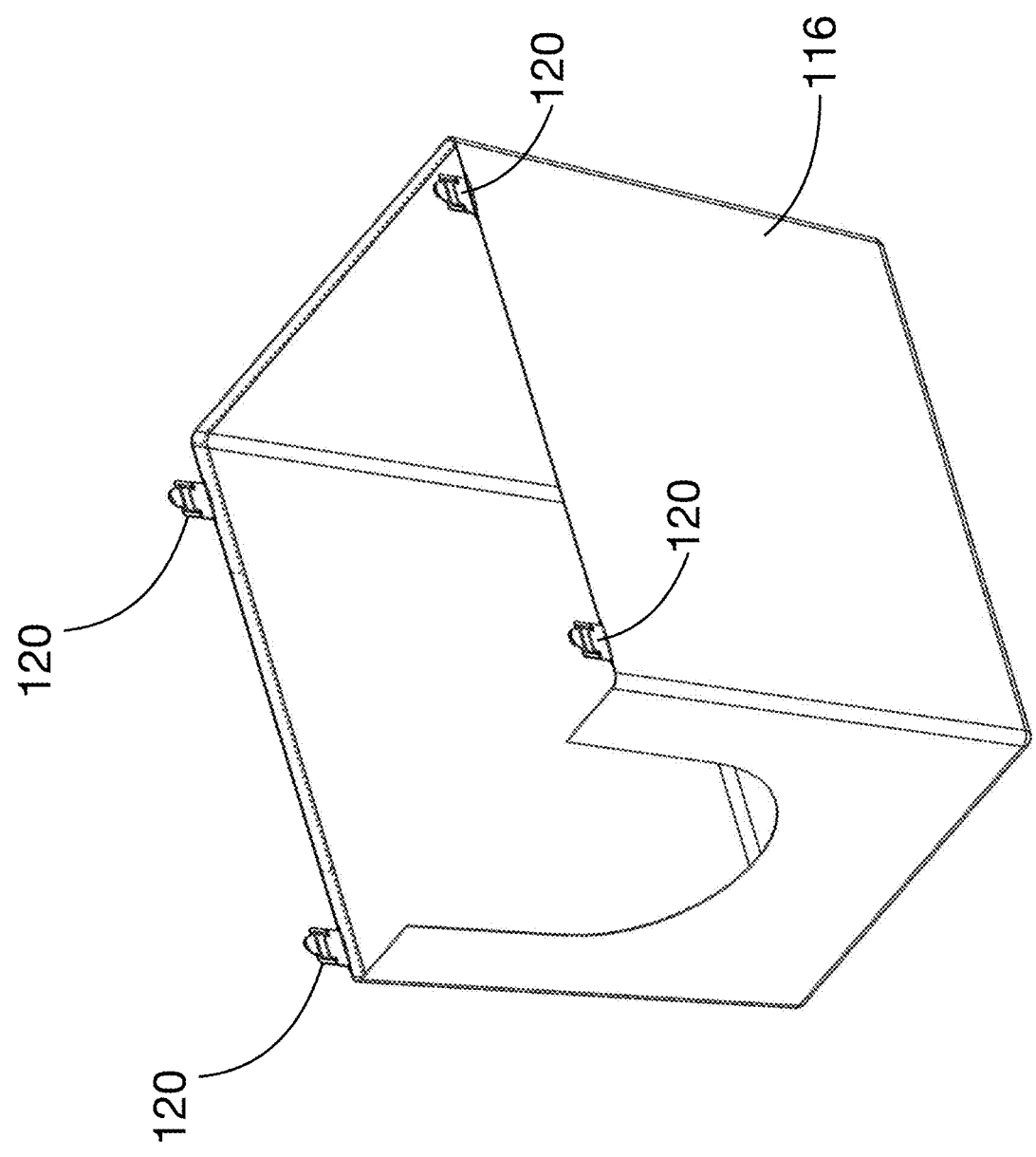
FIG. 2 is a perspective view of a liner of the litter box in FIG. 1.

FIG. 2 shows the liner 116 used in the container 110 of FIG. 1. The liner 116 has a shape that corresponds to the shape of the container 110 and is inserted into the container 110 as shown in FIG. 1. The liner 116 includes tabs 120 that extend upward from the upper edge of the liner 116. The tabs 120 correspond to respective ones of the pegs 112 and define holes through which the pegs 112 can be received when the liner 116 is placed in the container 110. The connection between the tabs 120 and the pegs 112 suspends and holds the liner 116 in place in the container 110.

Figure 3:
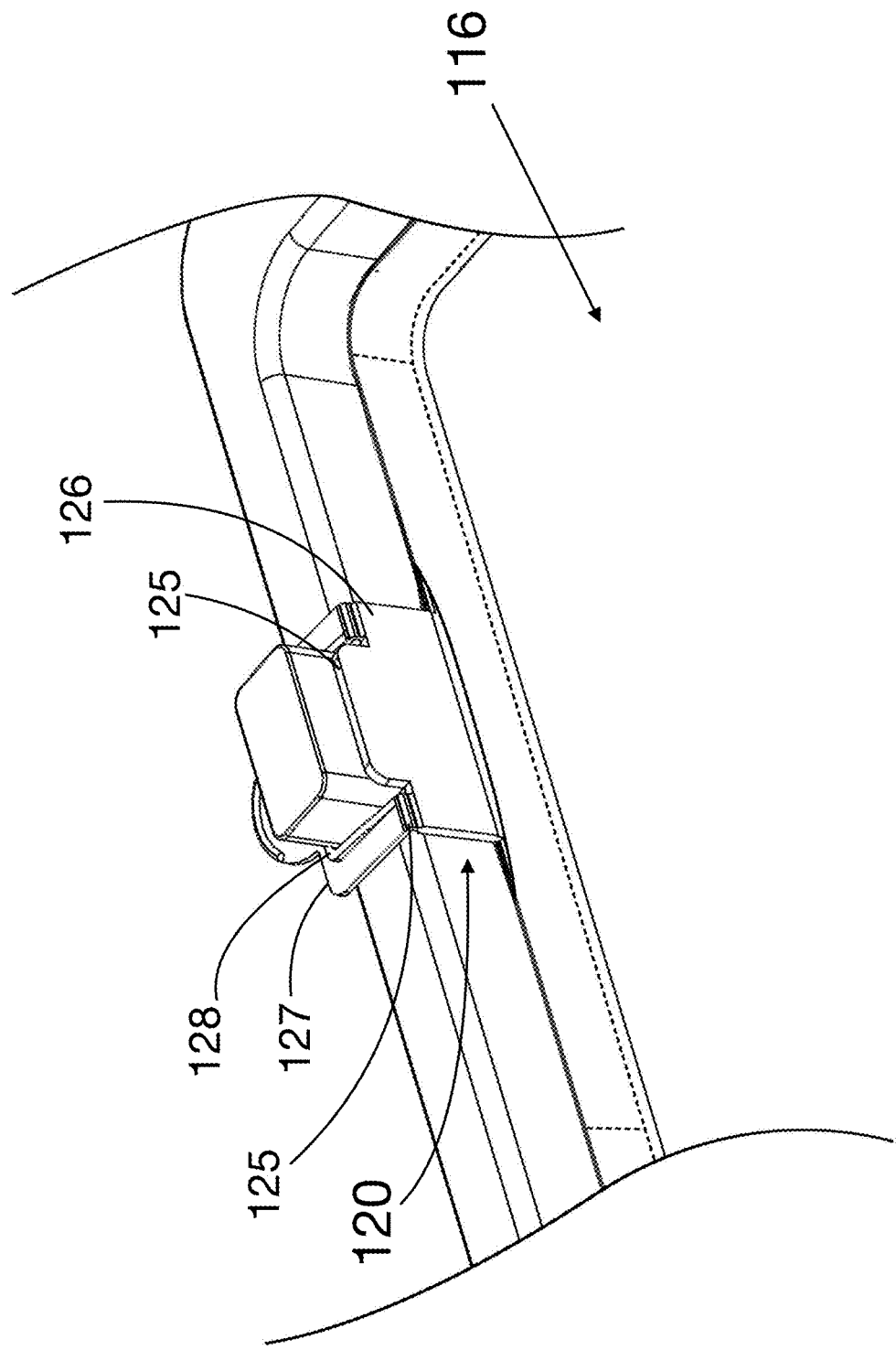
FIG. 3 is a closer view of area A in FIG. 1.
Figure 4:
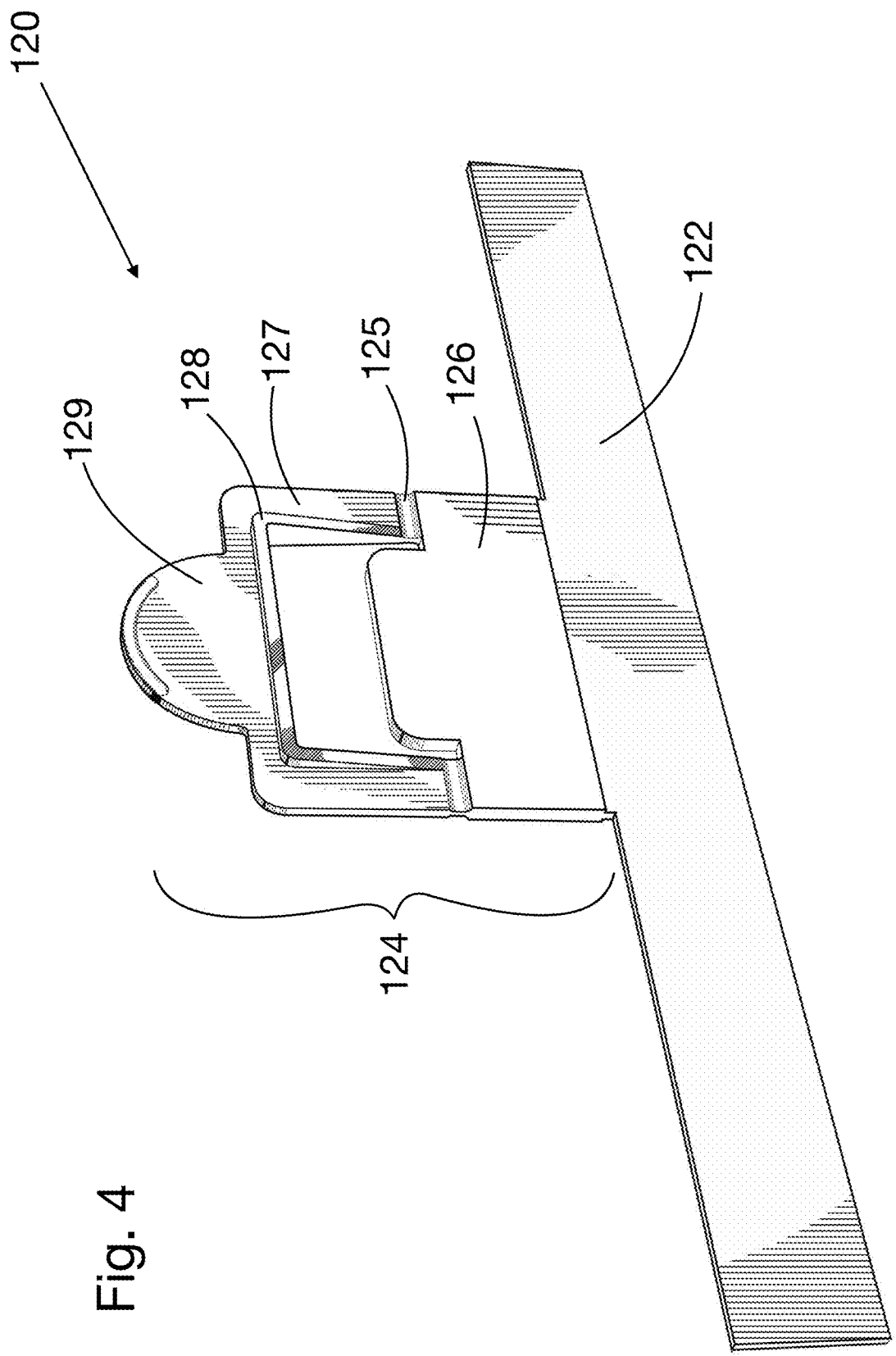
FIG. 4 is a perspective view of a tab of the liner in FIG. 2.
Figure 5:
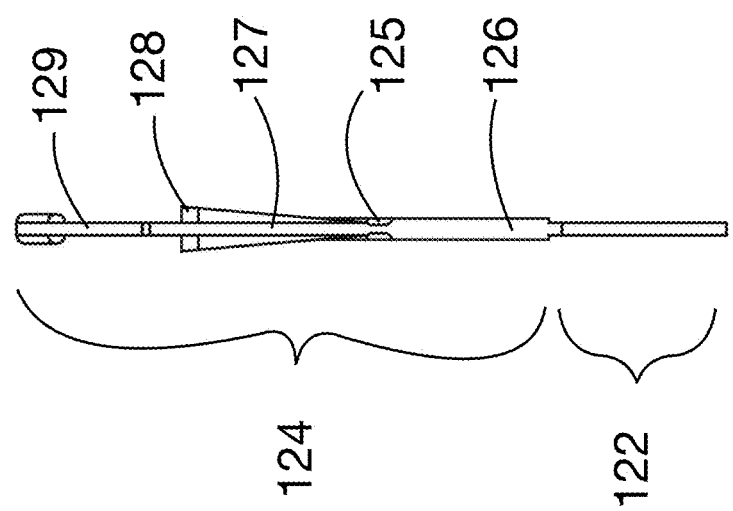
FIG. 5 is a side view of the tab in FIG. 4.

As shown in FIGS. 3-5, the tab 120 includes a stiffener part 122 that braces a portion of the liner against an inner wall of the container and a connection part 124 that connects the liner 116 to a peg 112 on the container 110. The stiffener part 122 is sewn into a top portion of the liner 116. In the specific embodiment shown in FIGS. 1 and 2, a top of the liner is folded over and the stiffener part 122 is disposed between the folded parts with the connection part 124 passed through a hole in the liner 116. The folded parts of the liner 116 are then sewn to form a pocket in the top portion of the liner 116 that holds the stiffener part 122. Although the stiffener part 122 is shown as being sewn in a pocket of the liner 116, any other fixing techniques such as, but not limited to, stitching, friction fitting, gluing, welding, pinning, riveting, snap-fitting, and clinching may be used to fix the stiffener part 122 to the liner 116.

The connection part 124 includes a first portion 126 connected to the stiffener part 122 and a second portion 127 connected to the first portion 126 by a living hinge 125. When the liner 116 is placed in the container 110, the second portion 127 is pivoted approximately 90° relative to the first part 126 about the living hinge 125. The living hinge 125 allows the liner 116 to be packaged and shipped in a flat form. The second portion 127 is pivoted relative to the first portion 126 when the liner 116 is ready to be placed in the container 110. The second portion 127 is then placed over one of the pegs 112. In an alternative embodiment, the living hinge may be omitted and the second portion 127 always extends 90° relative to the first part 126.

The first portion 126 allows a top of the liner 116 to be held at a distance from the top of the container 110, i.e., the distance between the hinge 125 and the stiffener part 122. However, the first portion 126 may be omitted so that the second portion 127 of the connection part 124 is connected directly to the lower tab part 122 with or without the living hinge 125.

The stiffener part 122 acts as a brace and holds the top of the liner 116 against the inner wall of the container 110. The stiffener part 122 extends laterally on opposing sides of the connection part 124. In a preferred embodiment, one side of the stiffener part 122 extends to a position proximate a corner of the container 110 to hold the top of the liner 116 taut against the container 110.

The second portion 127 of the connection part 124 includes a rib 128 on both a front side and a back side that extends along the border of the hole through which the peg 112 is received. The rib 128 reinforces the hole.

The second portion 127 also includes a grip portion 129 that extends from the free end of the connection part 124. The grip portion 129 allows a user to grasp the second portion 127 for pivoting second portion 127 relative to the first portion 126 about the living hinge 125. The grip also facilitates removing the liner 116 from the container 110 when required.

The entire tab 120 may be made as a monolithic element made of one uniform material, i.e., polypropylene, or another plastic. However, the tab is not limited to a plastic and may be made of other materials such as cardboard or a metal. As a further alternative, the connection part 124 and stiffener part 122 may be made of two different materials. For example, the stiffener part 122 may be made of metal and the connection part 124 made of plastic. In this case, the stiffener part 122 and the connection part 124 could be connected by a molding process.

Figure 6:
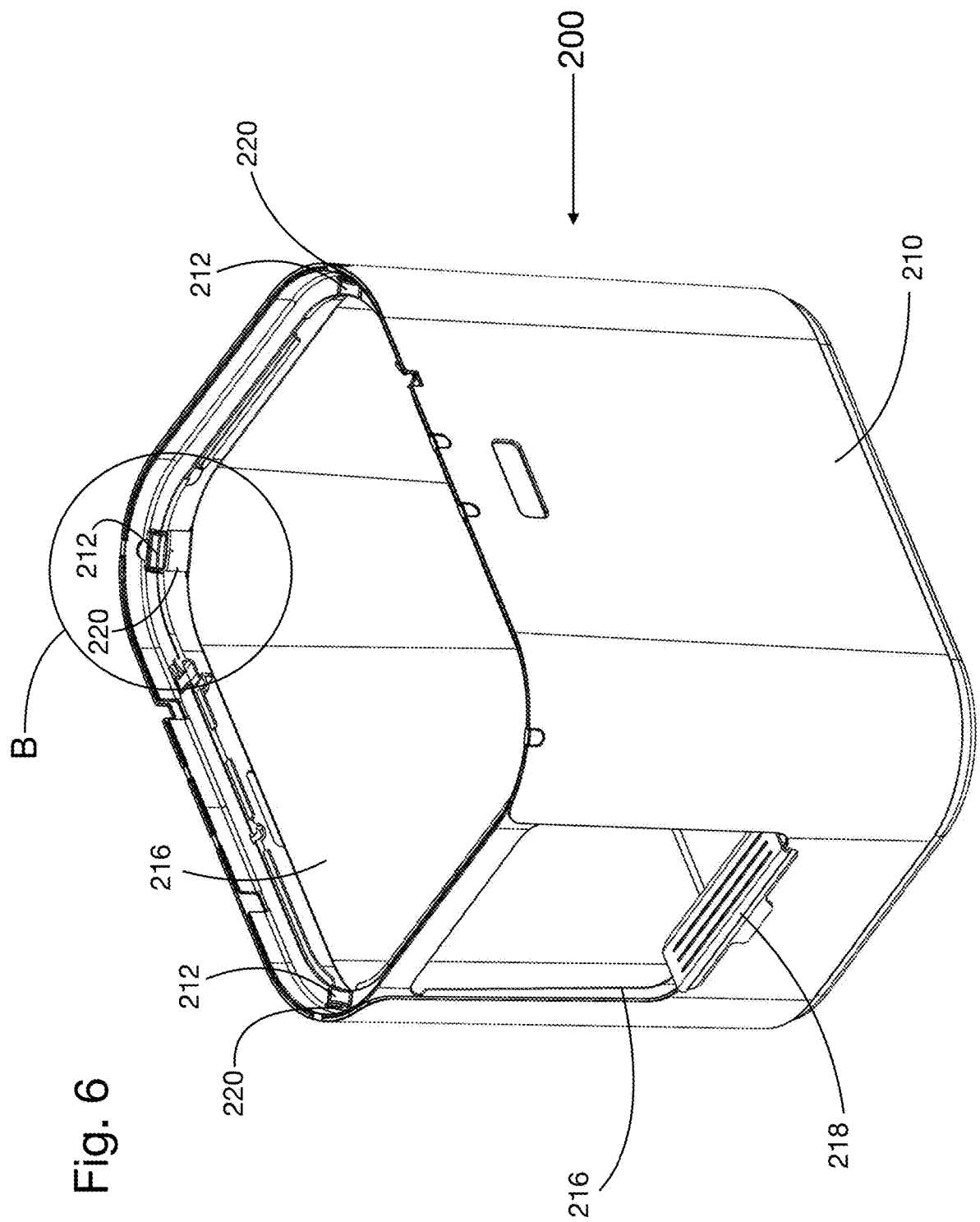
FIG. 6 is a perspective view of a litter box according to another embodiment of the present invention.

FIG. 6 shows another embodiment of a litter box 200 with a container 210 that includes an opening 218 on one of the wall sections. The liner 216 has a corresponding opening. The container 210 includes pegs 212 that extend horizontally from an inner wall of the container 210 and the liner 216 includes tabs 220 configured to be received on the pegs to suspend and hold the liner 216 in place in the container 210. An additional clip 225 may be used at the bottom of the opening 218 to secure the liner 216 to the container 210 to the opening 218.

Figure 7:
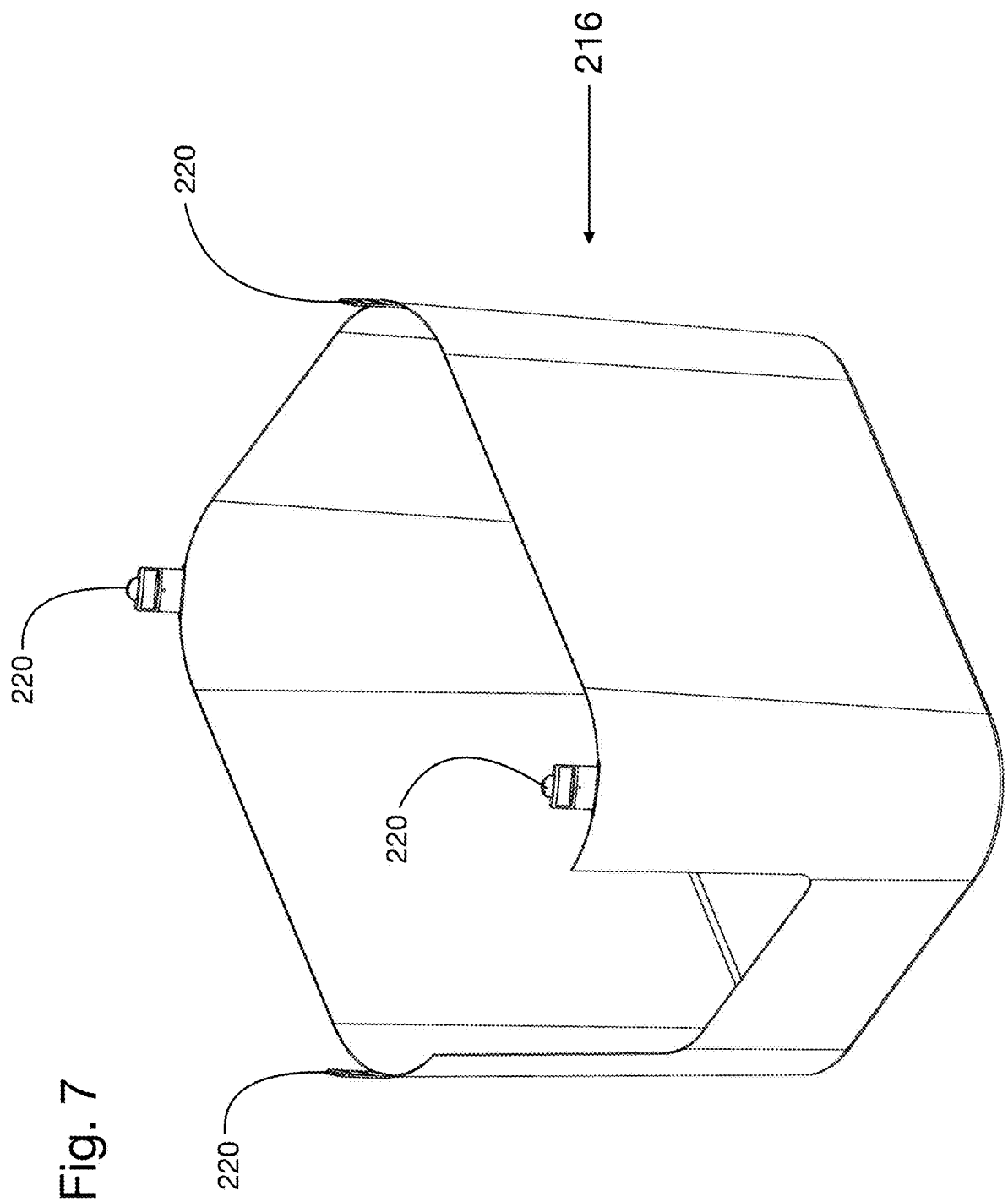
FIG. 7 is a perspective view of a liner of the litter box in FIG. 6.

FIG. 7 shows the liner 216 that is used in the litter box 200. In this embodiment, the pegs 212 are arranged in rounded corners of the container 210 and the stiffeners 256 (shown in FIG. 11) of the tabs 220 bend to match the curve of the container 210. Although four pegs 212 and four tabs 220 are shown, any number of pegs and tabs may be used depending on the size and shape of the container 210 and the material of the liner 216, or any other factors that affect the ability of the liner to be held against the inner wall of the container.

Figure 8:
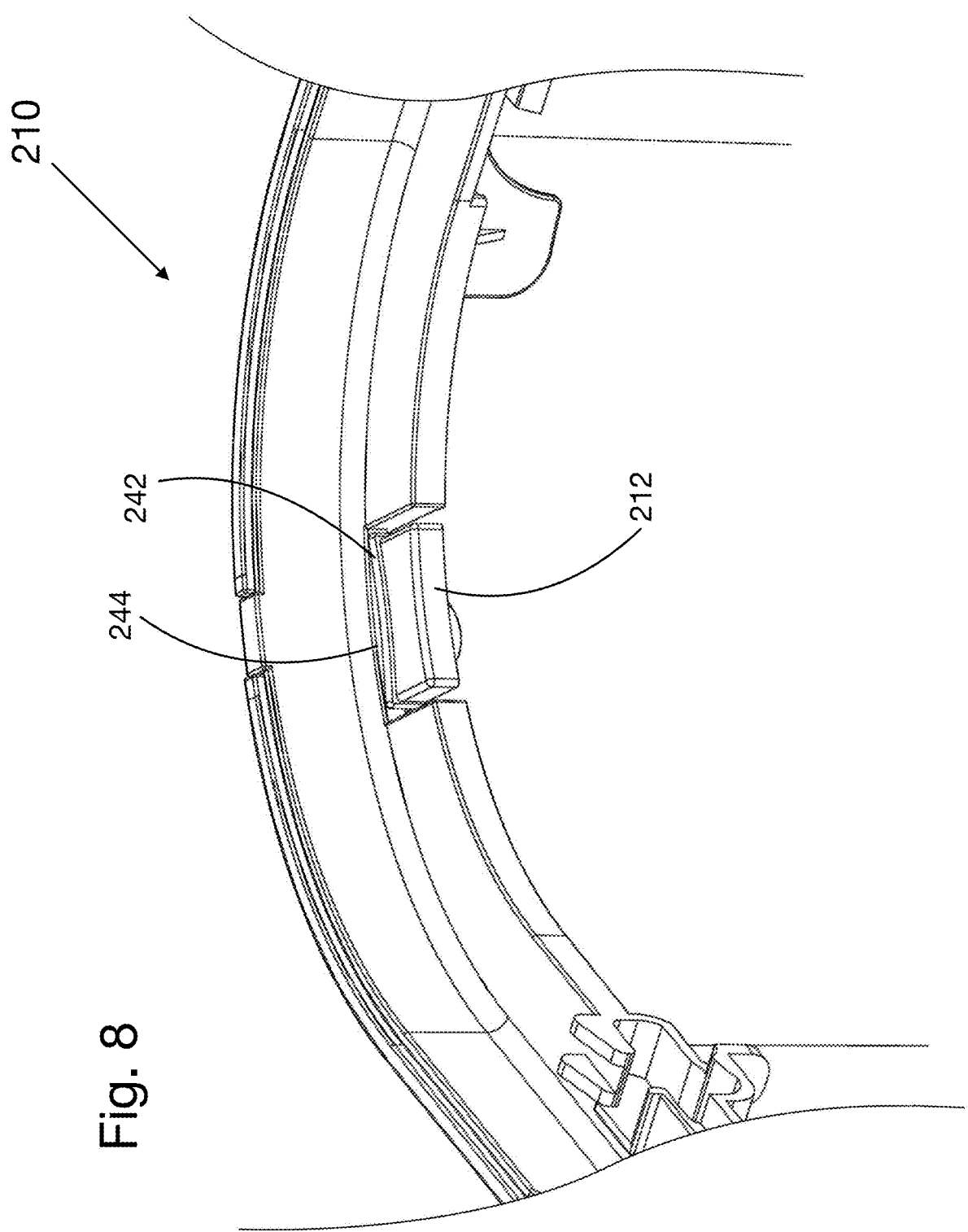
FIG. 8 is a perspective view of a section of the litter box in FIG. 6 shown without the liner.
Figure 9:
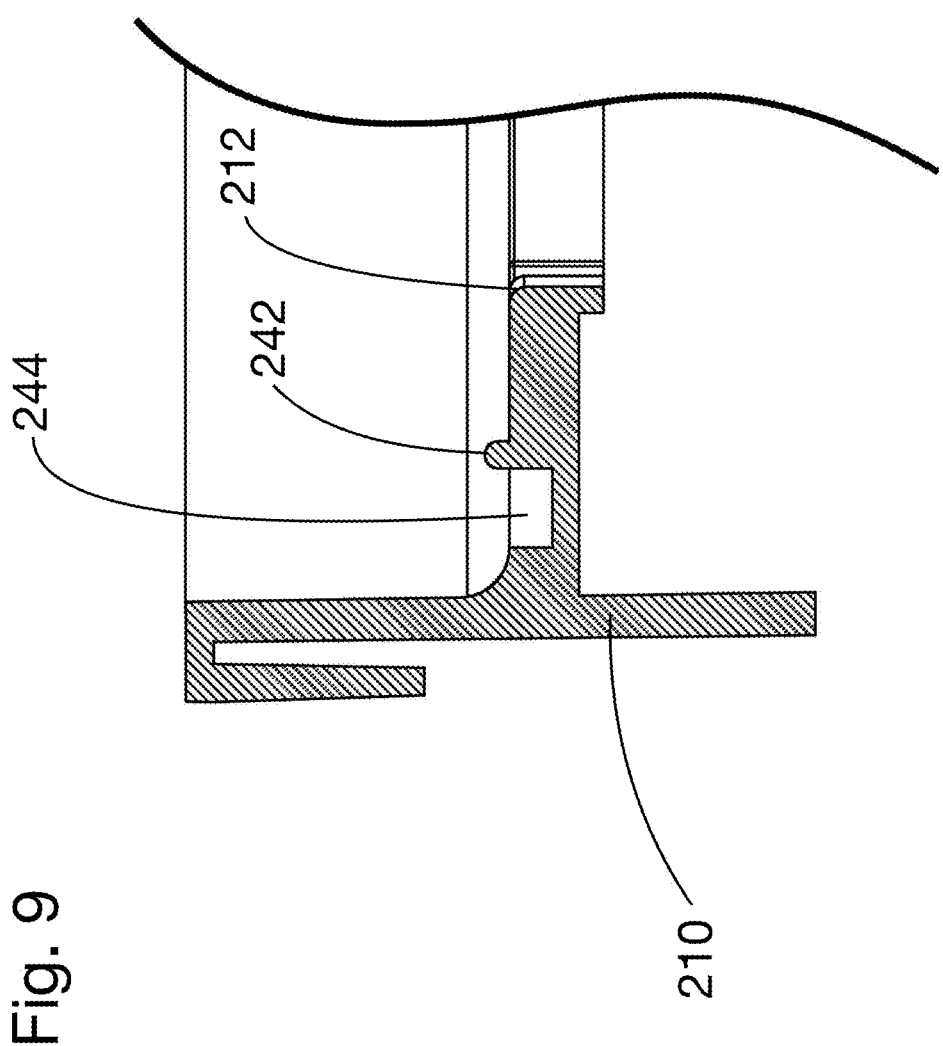
FIG. 9 is a side view of the horizontal peg of FIG. 8.

The horizontal pegs 212 are shown in more detail in FIGS. 8 and 9. In this embodiment, the tabs 220 are not required to have a living hinge. To help maintain the tabs 220 on the horizontal peg 212, a groove 244 or channel may be formed at the base end of the peg 212 in which a portion of the tab 220 is received. The tab 220 must be lifted out of the groove 244 to remove the tab 220 from the peg 212. Further, a rib 242 is placed in front of the groove as additional means to prevent the tab from inadvertently sliding off of the peg 212. Instead of using both the groove 244 and the rib 242, one or the other of the groove 244 and the rib 242 may be used.

Figure 10:
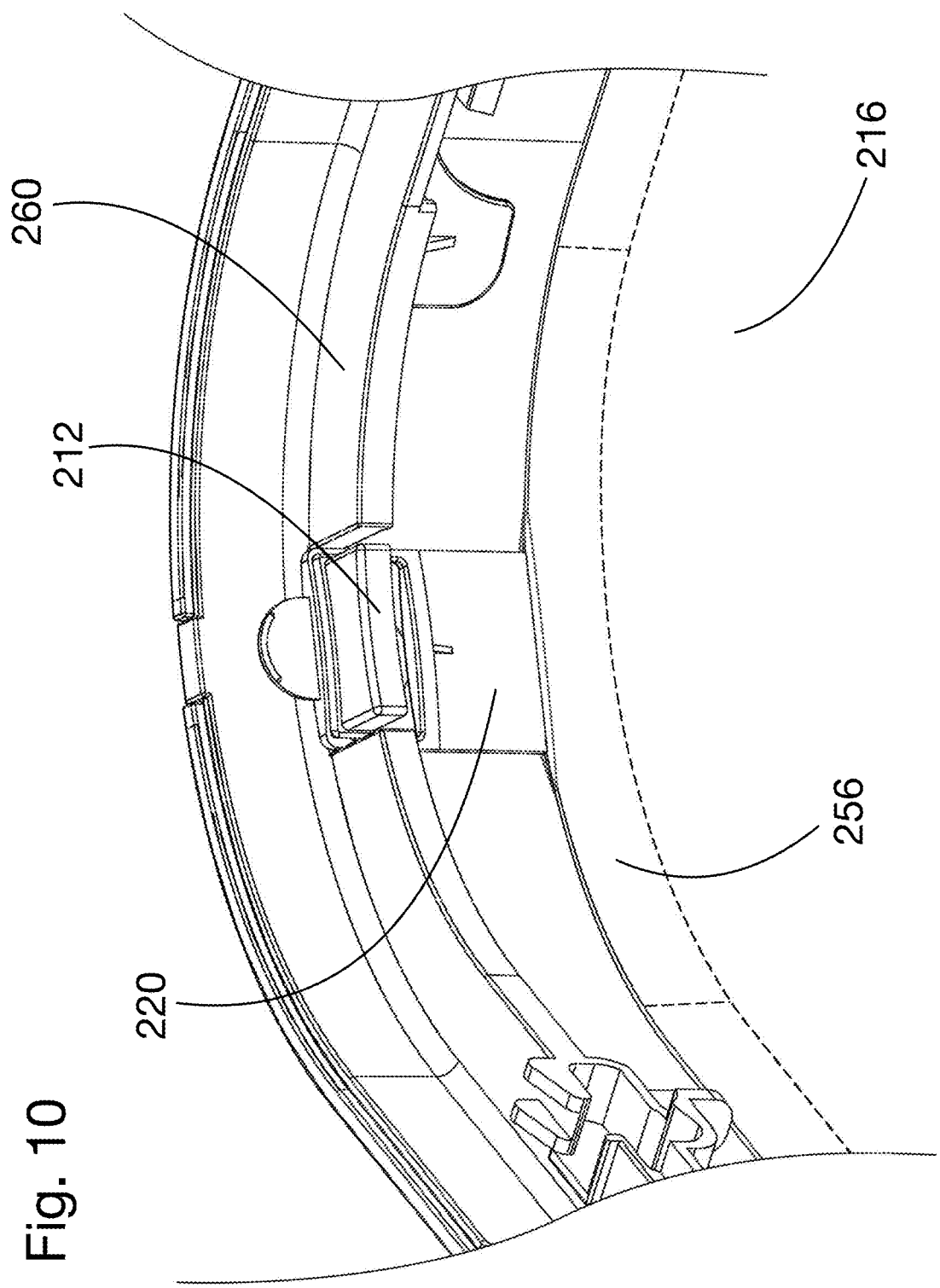
FIG. 10 is a perspective view of the section of the litter box in FIG. 8 with the liner inserted.

As shown in FIGS. 6 and 10, the horizontal peg 212 may be formed in a ledge 260 that extends around the container 210, such as, for example, a ledge that is used to hold a cover (not shown) of the litter box 200.

FIG. 11 shows an embodiment of the tab 220 that can be used in the embodiments of FIG. 6-10, which have the horizontally projecting peg 212. The tab 220 includes a connection part 254 and a stiffener part 256. The stiffener part 256 is similar to the stiffener part 122 described above. The upper portion 254 includes an opening for receiving the peg 212 and a grip portion 258 to facilitate removing the tab 220 from the peg 212.

Instead of being formed from a separate material and connected to the liner, the tab 120, 220 may be incorporated into a liner as a die-cut portion of the material of the liner. In this alternative embodiment, a separate stiffener could be incorporated into the liner in the same manner as previously described, or the stiffener could also be made of the same material as the liner, i.e., by folding over a portion of the liner.

The embodiments shown and described are four-sided litter boxes with front entry designs. However, the invention is not limited to such a design and can include a litter box of any shape. Also, the invention can also be applied to top-entry litter boxes instead of side entry boxes.

Thus, while there has been shown and described and pointed out the fundamental novel features of the invention is applied to a preferred embodiment thereof, it will be understood that various omissions and substitutions and changes in the form and details of the devices illustrated, and in their operation, may be made by those skilled in the art without departing from the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A litter box, comprising:
   a container having a wall;
   a plurality of pegs that project upward from a top of the wall or horizontally from an inner surface of the wall, the plurality of pegs being distributed along a circumference of the container;
   a liner that is insertable in the container, the liner having an upper edge;
   a plurality of tabs connected to the liner at or proximate the upper edge, each of the plurality of tabs having a connection part and a stiffener part, the connection part having an opening in which a respective peg of the plurality of pegs is receivable to hold the liner in place in the container, the stiffener part being connected to the liner, and the stiffener part extending laterally from opposing sides of the connection part and holding a portion of the upper edge of the liner against the wall of the container when the respective peg is received in the each of the plurality of tabs,
   wherein the plurality of pegs project upward from the top of the wall, and the each of the plurality of tabs includes a living hinge on the connection part, by which the opening of the each of the plurality of tabs can be pivoted to fit over the respective peg of the plurality of pegs.

2. The litter box according to claim 1, wherein the container has four wall portions corresponding to four sides of the container and forming four corners, the four wall portions including a front wall portion, a rear wall portion, a first side wall portion, and a second side wall portion, and
   the plurality of pegs comprises four pegs arranged so that the plurality of tabs connected to the four pegs holds the liner in the four corners of the container.

3. The litter box according to claim 2, wherein a first pair of the four pegs is arranged on the first side wall portion and a second pair of the four pegs is arranged on the second side wall portion.

4. The litter box according to claim 3, wherein the four pegs are disposed so that one end of the stiffener part of the each of the plurality of tabs holds the liner in each of the four corners of the container.

5. The litter box according to claim 2, wherein the four corners are curved wall sections, and the four pegs are disposed at the curved wall sections of the four corners.

6. The litter box according to claim 1, wherein the connection part of the each of the plurality of tabs is divided into a first part and a second part by the living hinge, the first part being disposed between the living hinge and the stiffener part and the second part including the opening.

7. The litter box according to claim 1, wherein the each of the plurality of tabs includes a rib disposed on at least a portion of a border of the opening.

8. The litter box according to claim 1, wherein the each of the plurality of tabs includes a grip portion extending from a free end of the each tab.

9. The litter box according to claim 1, wherein the stiffener part of the each of the plurality of tabs is connected to the liner by stitching, friction fitting, gluing, welding, pinning, riveting, snap-fitting, and or crimping.

10. The litter box according to claim 1, wherein the stiffener part of the each of the plurality of tabs is sewn into a corresponding pocket of the liner.

11. The litter box according to claim 1, wherein the each of the plurality of tabs is die-cut from a portion of the same material as the liner.

* * * * *